US007784208B2

(12) United States Patent
Thompson

(10) Patent No.: US 7,784,208 B2
(45) Date of Patent: Aug. 31, 2010

(54) DISPLAY PANEL FOR A DOOR HANDLE

(76) Inventor: Peter J. Thompson, 22 Arran Court, Courtice, Ontario (CA) L1E 2E5

( * ) Notice: Subject to any disclaimer, the term of this patent is extended or adjusted under 35 U.S.C. 154(b) by 0 days.

(21) Appl. No.: 12/073,022

(22) Filed: Feb. 28, 2008

(65) Prior Publication Data

US 2008/0148612 A1 Jun. 26, 2008

Related U.S. Application Data

(63) Continuation-in-part of application No. 11/582,362, filed on Oct. 18, 2006, now abandoned.

(30) Foreign Application Priority Data

Oct. 19, 2005 (CA) .................................... 2523926

(51) Int. Cl.

| | |
|---|---|
| ***G09F 23/00*** | (2006.01) |
| ***G09F 7/00*** | (2006.01) |
| ***G09F 11/00*** | (2006.01) |
| ***G09F 15/00*** | (2006.01) |
| ***G09F 15/02*** | (2006.01) |
| ***G09F 3/20*** | (2006.01) |
| ***G09F 3/18*** | (2006.01) |
| ***A47B 96/06*** | (2006.01) |
| ***G09F 7/18*** | (2006.01) |
| ***A47J 45/10*** | (2006.01) |
| ***A47B 95/02*** | (2006.01) |
| ***A47J 45/07*** | (2006.01) |

(52) U.S. Cl. ........................ 40/599; 40/661.12; 40/907; 40/491; 40/651; 40/661.03; 40/585; 40/490; 40/605; 40/606.07; 248/214; 248/231.81; 248/229.15; 248/231.71; 248/229.16; 248/488; 16/435; 16/413; 16/443; 16/412; 16/416; 16/425; 16/404

(58) Field of Classification Search ................... 40/599, 40/661.12, 907, 491, 651, 661.03, 585, 490, 40/605, 606.07; 248/214, 231.81, 231.78, 248/231.71, 229.16, 229.15, 488; 16/435, 16/431, 443, 412, 416, 425, 404, DIG. 12, 16/DIG. 24

See application file for complete search history.

(56) References Cited

U.S. PATENT DOCUMENTS

| | | | |
|---|---|---|---|
| 313,336 | A | 3/1885 | Jensen |
| 329,189 | A | 10/1885 | McCullough |
| 369,085 | A | 3/1887 | Tyler |
| 405,346 | A | 6/1889 | Condell |
| 417,833 | A | 12/1889 | Oliphant |

(Continued)

FOREIGN PATENT DOCUMENTS

| | | | |
|---|---|---|---|
| CA | 2454212 | A1 | 6/2005 |

*Primary Examiner*—Lesley Morris
*Assistant Examiner*—Syed A Islam

(57) ABSTRACT

The display panel has an outer surface to which a sign may be attached and an inner surface having a fastener composed of resiliently deformable material. An end of the fastener is separated from the display panel by a slit which is adapted to receive an outer plate of a conventional door handle The outer plate is held in the slit by the resiliently deformable composition of the fastener. The plate may however be removed from the slit by the application of a force opposed to the bias of the resilient material in order to widen the slit.

14 Claims, 6 Drawing Sheets

U.S. PATENT DOCUMENTS

| | | | | |
|---|---|---|---|---|
| 502,641 | A | 8/1893 | Scheen | |
| 585,657 | A | 7/1897 | Dickson | |
| 1,830,383 | A | 11/1931 | Bos | |
| 4,223,931 | A | 9/1980 | Neary | |
| 4,344,244 | A * | 8/1982 | Tyke | 40/611.05 |
| 5,182,827 | A * | 2/1993 | Carrier et al. | 5/498 |
| 5,456,034 | A * | 10/1995 | Lewis et al. | 40/666 |
| 5,647,248 | A | 7/1997 | Silsby, Jr. | |
| 5,713,614 | A | 2/1998 | Anderson | |
| 6,119,385 | A * | 9/2000 | Olivier | 40/661.12 |
| 6,601,809 | B1 * | 8/2003 | Gebrara | 248/229.16 |
| 6,669,241 | B1 | 12/2003 | Kelley | |
| 6,948,272 | B1 | 9/2005 | Olivier et al. | |
| 7,089,695 | B2 * | 8/2006 | Fast et al. | 40/642.01 |
| 2001/0013186 | A1 | 8/2001 | Malitas | |
| 2003/0033690 | A1 | 2/2003 | Lin | |

* cited by examiner

FIG. 5.
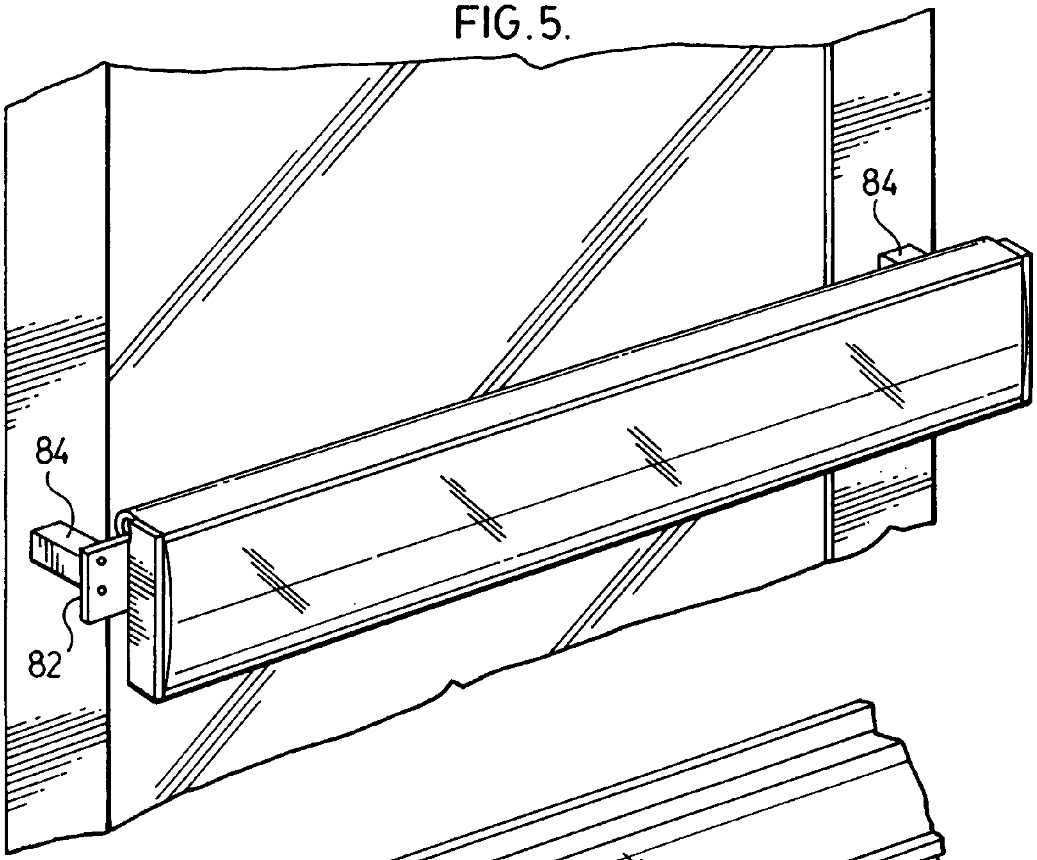
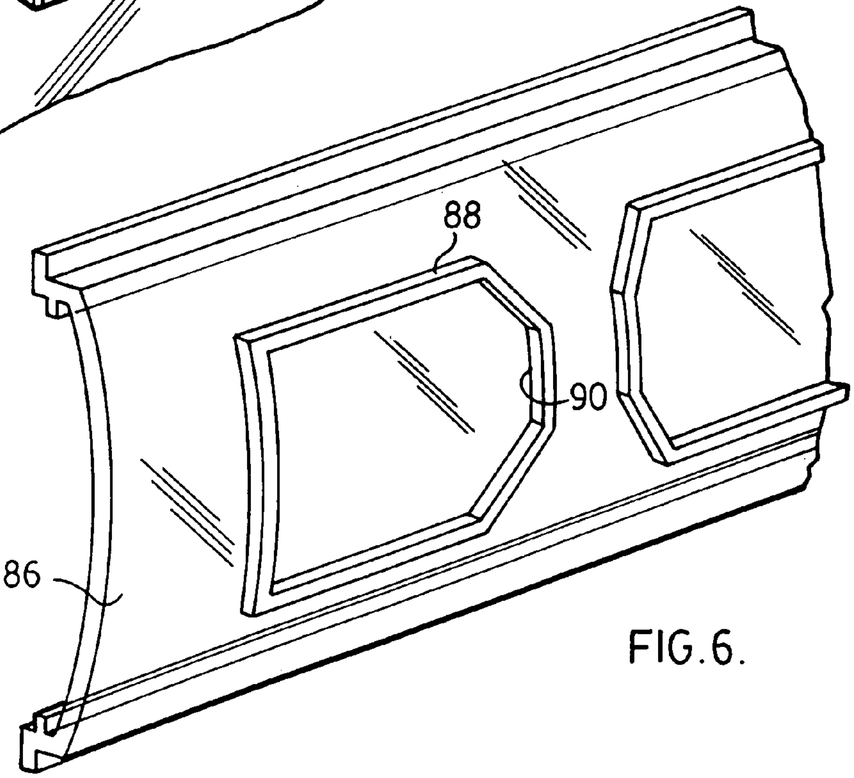
FIG. 6.

DISPLAY PANEL FOR A DOOR HANDLE

This application is a Continuation-In-Part of application Ser. No. 11/582,362 filed on Oct. 18, 2006 now abandoned, the entire contents of which are hereby incorporated by reference and for which priority is claimed under 35 U.S.C. §120.

FIELD OF THE INVENTION

This invention relates to display panels for supporting signs and more particularly to a display panel which may be removably attached to the handle of a door and to which a sign may be removably attached.

BACKGROUND OF THE INVENTION

It is known to attach a display panel which supports a sign to a door handle of the type which is either pushed or pulled but is not turned. Such handles are found in the doors which open to the outdoors of most commercial and industrial buildings in North America.

A handle which is pushed or pulled usually has an elongated outer plate which is spaced apart from the door so that the handle can be gripped should the door be opened by pulling. Known display panels are attached to such handles by various means such as clamps, screws and bolts and examples of such display panels are described in Canadian patent application no. 2,454,212.

A sign supported by the panel may display an advertisement, a message such as “Push” or “Pull” or other information. It is generally thought that a door handle is a good location for a sign since the sign is likely to be noticed by everyone who walks through the door for the obvious reason that the handle must be deliberately looked at to be usable.

SUMMARY OF THE INVENTION

The display panel of the subject invention which may be easily attached and detached from most conventional door handles that are pushed or pulled. The display panel has an outer surface to which a permanent sign can be attached. Alternatively, a temporary sign can be readily attached to and detached from the display panel should that be desired.

Briefly the display panel of the subject invention includes inner and outer oppositely facing surfaces. The outer surface has means for removable attachment of a sign while the inner surface has a fastener which is composed of resiliently deformable material. The fastener comprises a wall which commences at a starting position on the display panel, continues away from the inner surface on a first curve to an apex then continues on a second curve toward the inner surface and ends at a terminal edge. The terminal edge faces the inner surface and is the closest portion of the wall to the inner surface on its second curve. The terminal edge is spaced apart from the inner surface by a slit. The slit is free of any obstruction therein and is adapted to receive the outer plate of the door handle therein. The terminal edge is biased by the resiliently deformable material of the fastener into contact with the outer plate when the plate is received in the slit. As a result, removal of the plate from the slit is resisted. The application of a force opposed to the bias of the resilient material causes the slit to widen in order to permit the removal of the outer plate therefrom

DESCRIPTION OF THE DRAWINGS

The display panel of my invention is described with reference to the accompanying drawings in which:

FIG. 5 is a perspective view of a the display panel in conjunction with a conventional push-type door handle;

FIG. 6 is a perspective view, in larger scale, of the sign illustrated in FIG. 5;

Like reference characters refer to like parts throughout the description of the drawings.

DESCRIPTION OF PREFERRED EMBODIMENTS

Figure 1:
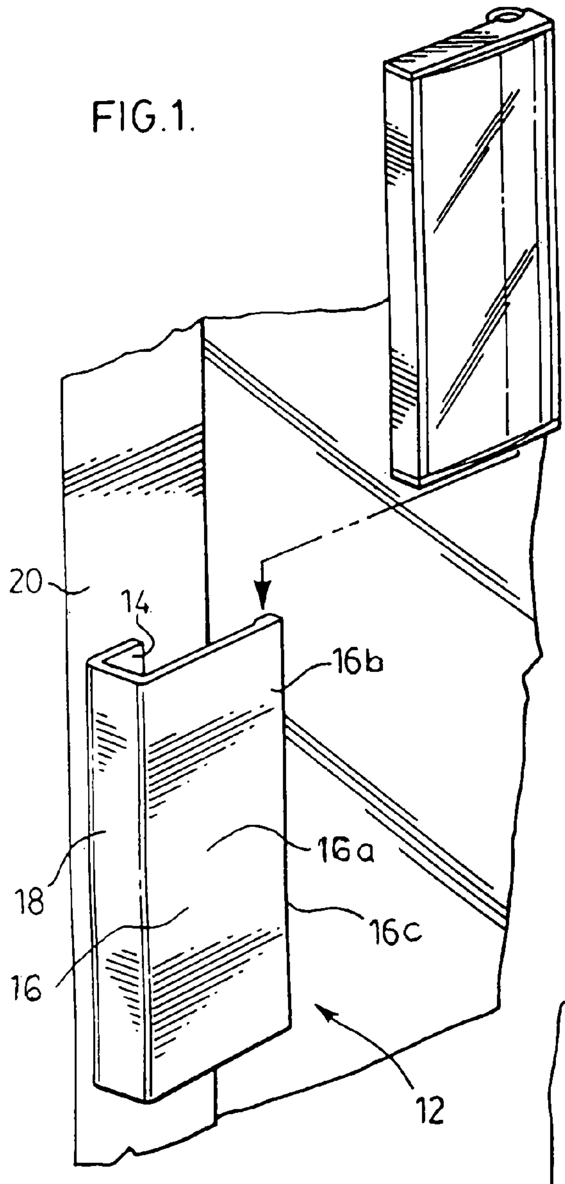
FIG. 1 is a perspective view of a relatively long display panel of the subject invention in combination with a conventional door handle.

With reference to FIG. 1 the display panel of the invention, generally 10, is shown in conjunction with a conventional door handle, generally 12. The door handle has inner and outer plates 14, 16 interconnected by a web 18. As is conventional, the inner plate has a number of apertures through which screws or bolts pass in order to attach the plate to a door 20. The outer plate has a middle portion 16*a* and a distal portion 16*b* which terminates at an outer edge 16*c*.

Figure 2:
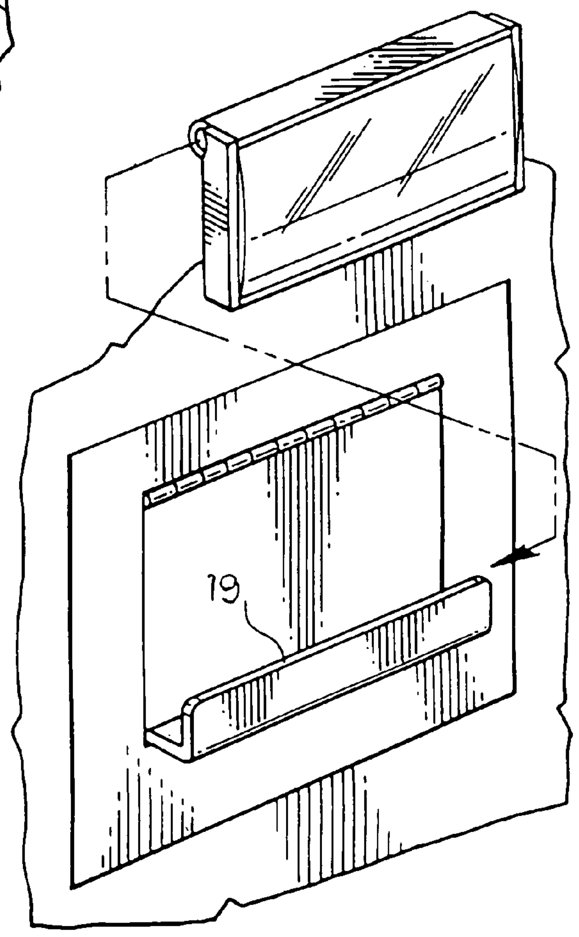
FIG. 2 is a perspective view of a shorter and wider display panel in combination with a similarly shaped door handle.

The door handle illustrated in FIG. 1 is vertically extending while the door handle in FIG. 2 is horizontally extending. In FIG. 2, outer plate 19 is equivalent to plate 16 in FIG. 1.

Figure 3A:
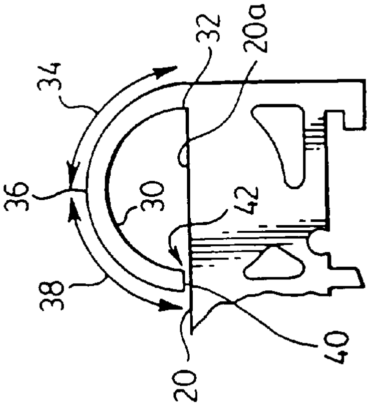
FIG. 3A is an enlarged elevation of a fastener of the display panel.
Figure 3:
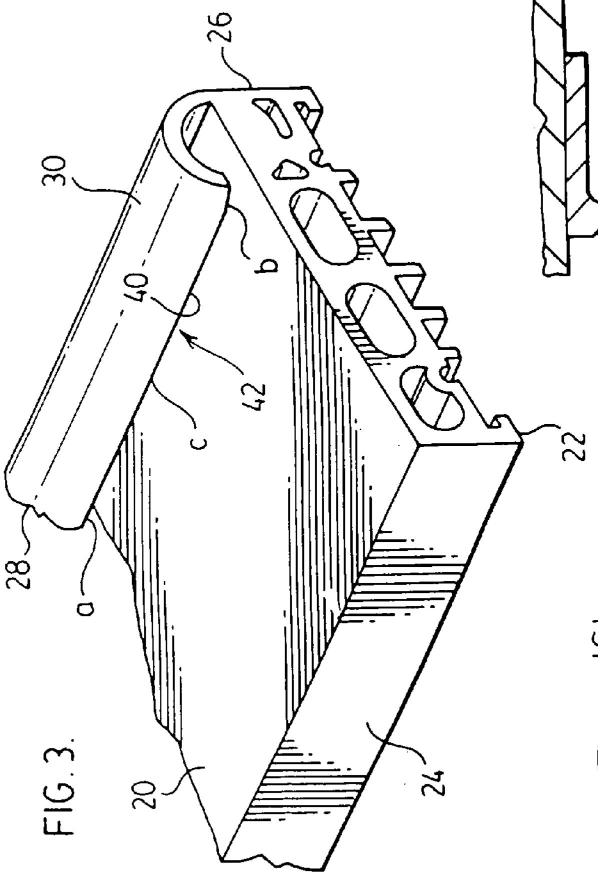
FIG. 3 is a perspective view of the display panel.

With reference to FIGS. 3 and 3A, the display panel has inner and outer oppositely facing surfaces 20, 22 and oppositely facing side surfaces 24, 26. The inner surface is flat and terminates at a semi-circular fastener 28.

The fastener is composed of a wall 30 which commences at a starting position 32 on the display panel. The wall continues away from the inner surface on a first curve 34 to an apex 36 then continues on a second curve 38 toward the inner surface 20 of the display panel and ends at a terminal edge 40. The terminal edge faces the inner surface and is the closest portion of the second curve to the inner surface.

Figure 3B:
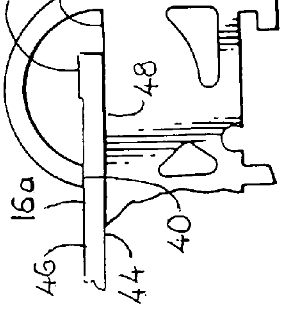
FIG. 3B is another enlarged elevation of the fastener and a portion of a panel of the door handle.

The terminal edge is spaced apart from the inner surface by a slit 42. The slit is completely free of any obstruction therein and runs the length of the fastener. The slit is adapted to receive the distal portion 16*b* of the outer door plate therein as illustrated in FIG. 3B. The fastener is composed of resiliently deformable material which biases the terminal edge 40 into contact with the outer plate when the outer plate is received in the slit as illustrated in FIG. 3B with resulting resistance to removal of the plate from the slit.

The thickness of the central portion of the outer plate is greater than the width of the slit so that the terminal edge of the fastener must be physically separated from the inner surface of the display panel by means of a screw driver or other means before the distal portion of the outer plate can be inserted into the slit. Once the distal portion is beneath fastener 28 as illustrated in FIG. 3B, the terminal edge 40 of the fastener, being biased by the resiliently deform-able material of the fastener, will snap toward the display panel thereby securing the display panel firmly to the outer plate.

With reference to FIG. 3, that the slit is wider adjacent to its two ends or terminal portions a,b than in its middle or intermediate portion c. As a result, the outer plate may more easily be slid into one or the other end of the slit than would be the case if the slit were of uniform width throughout its length.

As previously indicated, the terminal edge and the portion of the inner surface which constitute the slit contact the outer plate throughout substantially their entire length except for the terminal portions of the slit as noted below. As a result, removal of the plate from between the edges is resisted throughout substantially the entire length of the slit. In order to remove the plate, a force opposed to the bias of the resilient material must be applied to widen the slit sufficiently in order to permit the removal of the plate from the slit.

With further reference to FIG. 3B, the outer plate of the door handle is defined by oppositely facing inner and outer walls 44, 46 respectively. The walls are flat and parallel to one another as illustrated in FIG. 3B but are not necessarily so with one exception. The exception is the area 48 of the plate which defines the inner wall of the distal portion 16*b*. That area is generally flat. Also the area 20*a* of the inner surface of the display panel beneath the fastener is generally flat. The two areas 48 and 20*a* lie flat on each other.

Figure 4:
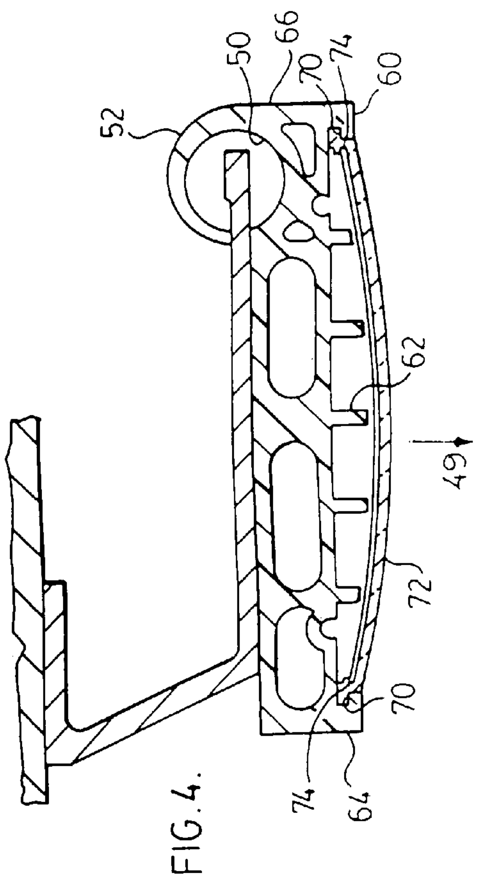
FIG. 4 is an elevation of the display panel which is substantially the same as the one illustrated in FIG. 3 in combination with a conventional door handle and a sign.

With reference to FIGS. 3B and 4, the terminal edge 40 of the fastener cooperates with area 20*a* of the display panel beneath the fastener to prevent the outer plate from pivoting about the terminal edge when the display panel is pulled away from the outer plate in the direction of arrow 49. This is the direction that the outer plate would be pulled if the door were opened by grasping end 64 of the display panel opposite fastener 52. When the display panel is grasped in this manner, it will not separate from the door handle but will remain firmly connected to it.

With reference to FIG. 4, the area of the inner surface of the display panel beneath fastener 52 is rounded unlike wall 20*a* of the previous Figures which is flat. On the inside wall of the display panel, a number of ribs 62 extend outwardly, The ribs are shortest nearest the side surfaces 64, 66 of the panel and longest at the centre. A groove 70 is formed adjacent to each side surface.

An arcuate sign 72 is removably attached to the outer surface of the display panel. The side margins 74 of the sign are received in grooves 70 while the area of the sign between the margins rest on the outer ends of the ribs.

With reference to FIG. 5, the display panel is shown attached to a conventional push-type door handle having a flat central plate 82 and bars 84 at either end of the plate for interconnecting the plate to the door.

With reference to FIG. 6, the illustrated sign is of the same construction as that illustrated in FIG. 4 and has an arcuate central area 86 to which a number of frames 88 are attached. Each frame has a groove 90 on its inner surface for receipt of the margins of a smaller sign.

Figure 7:
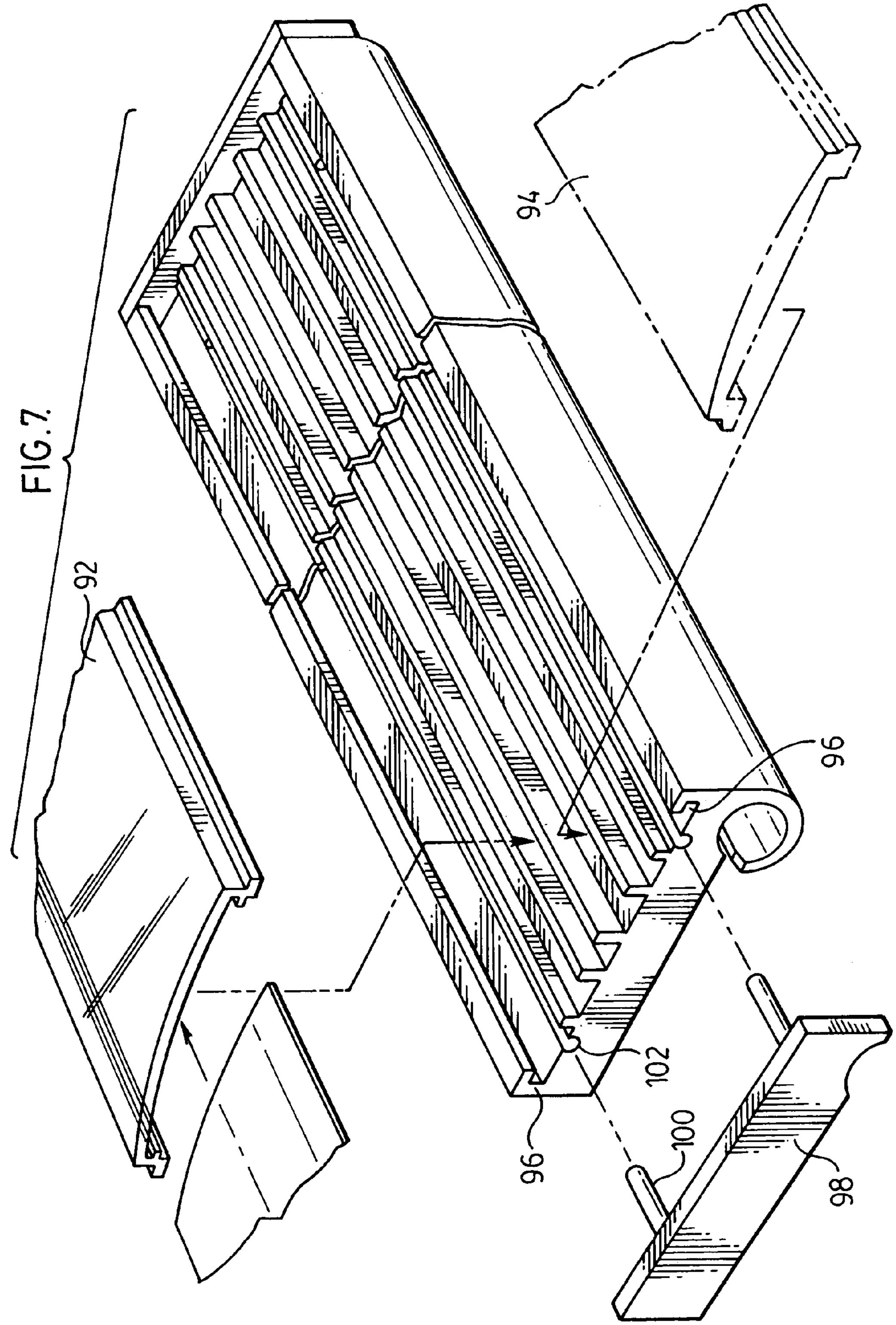
FIG. 7 is an exploded perspective view of the display panel in combination with two signs.

In FIG. 7, the display panel and signs are similar to those illustrated in FIG. 4 except that the display panel is widened to accommodate two signs 92, 94 The signs are arranged side by side in a parallel spaced-apart relationship on the outer surface of the panel.

The signs are secured to the panel by their margins which fit into grooves 96 in the outer surface of the panel and by an end plate 98 having a pair of spaced pins 100 which fit into channels 102 in the outer surface of the display panel.

Figure 8:
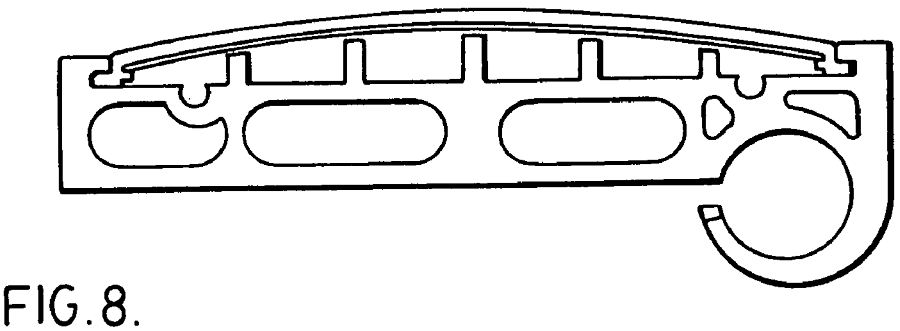
FIG. 8 is an end view of the display panel.
Figure 9:
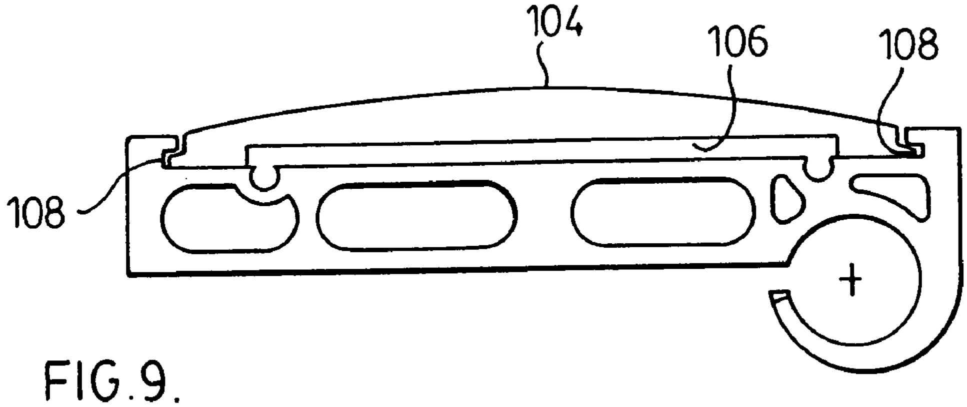
FIG. 9 is an end view of alternative embodiment of the panel.

The sign is normally flat but sufficiently flexible to form into an arc as illustrated in FIG. 8. Alternatively, the sign can be formed with an arcuate outer surface 104 as illustrated in FIG. 9, and a flat inner surface 106. Whichever the shape of the sign, it is secured to the display panel by grooves 108.

Figure 10:
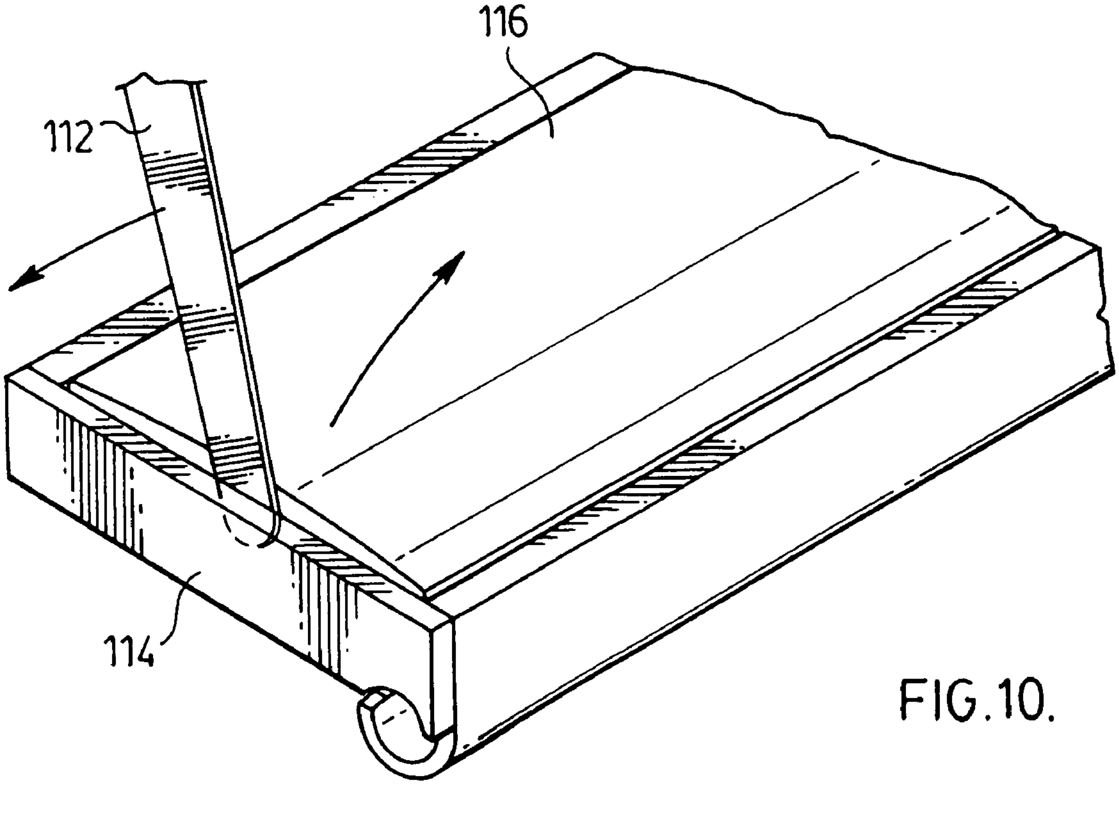
FIG. 10 is a perspective view of a portion of the display panel showing the manner in which a sign is disconnected from the panel.

With reference to FIG. 10, the sign can be removed from the display panel by prying it out by means of flat bar or lever 112. To this end, the lower end of the lever is placed between the end plate 114 and the sign 116 and the upper end of the lever is pushed down in order to remove the margins of the sign from the grooves of the display panel.

Figure 11:
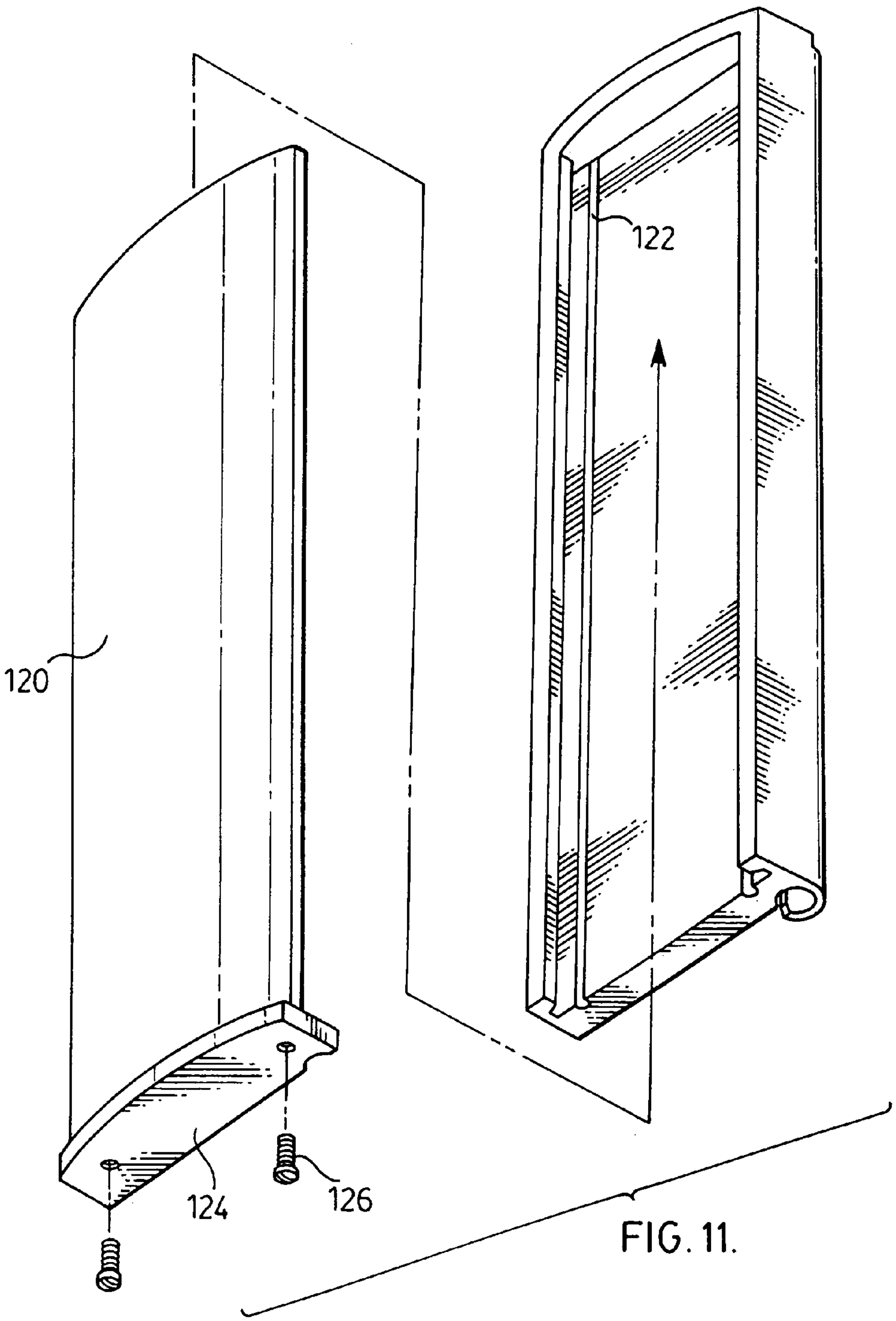
FIG. 11 is an exploded perspective view of the display panel and a sign disconnected therefrom.

With reference to FIG. 11, the sign 120 is slid along the grooves 122 of the display panel and is held in position by means of end plate 124 which is attached to the panel by means of screws 126.

The sign is composed of stiff but bendable material so that it can be inserted into the frame by flexing it slightly. Once inside the grooves of the display panel, the sign will remain there until it is intentionally flexed to allow it to be removed.

It will be understood, of course, that modifications can be made in the structure of the display panel without departing from the scope and purview of the invention as defined in the appended claims.

What is claimed is:

1. A display panel for attachment to a door handle, said door handle having an outer plate provided with a middle portion and a distal portion and being defined by oppositely facing inner and outer walls, the area of said inner wall which defines said distal portion being generally flat, said outer plate being adapted to be manually pushed or pulled in order to open and close a door, said display panel including inner and outer oppositely facing surfaces, said outer surface having means for removable attachment of a sign, said inner surface being flat throughout its extent save and except for one and only fastener which extends outwardly from said inner surface, said inner surface being otherwise free of any outward extensions therefrom, and opposing side walls extending between said inner and outer oppositely facing surfaces, said fastener being semi-circular and being composed of resiliently deformable material, said fastener comprising a wall having a free end defined by a terminal edge, and a fixed end, said wall commencing at said fixed end defined by the intersection of said inner surface and one of said side walls, continues from said intersection along a first curve extending from said intersection toward said opposing side wall over said inner surface to an apex and then continues from said apex along a second curve toward said inner surface and ends at said terminal edge, said terminal edge facing said inner surface and being the closest portion of said wall on said second curve to said inner surface, said terminal edge being spaced apart from said inner surface to form a slit between said terminal edge and said inner surface, said slit being free of an obstruction therein and being adapted to receive said outer plate of said door handle therein such that the area of the inner wall which defines said distal portion of said door handle lies flat on the area of the inner surface of the display panel beneath said fastener and such that said distal portion of the door handle is beneath said fastener while the middle portion of the door handle extends beyond said fastener, said terminal edge of said fastener being biased by said resiliently deformable material into contact with the outer wall of said outer plate when said outer plate is received in said slit with resulting resistance to removal of said plate from said slit, said terminal edge cooperating with the area of the inner surface of the display panel beneath said fastener to prevent the display panel from pivoting about said terminal edge when said display panel is pulled to open said door, and said terminal edge being flat and lying flat in contact with said door handle throughout its thickness such that said terminal edge prevents said distal portion of said door handle from pivoting about said terminal edge.

2. The display panel of claim 1 wherein said slit has terminal portions at either end and an intermediate portion between said terminal portions, the space between the edges which define said terminal portions being wider apart than the space between the edges which define said intermediate portion.

3. The display panel of claim 1 wherein said outer surface has a plurality of ribs which extend outwardly therefrom and against which said sign is adapted to abut.

4. The display panel of claim 1 wherein said means for removable attachment of a sign includes a groove which is formed in said outer surface and which is of a size suitable for accommodation of a margin of said sign such that said margin is removably secured therein.

5. The display panel of claim 4 wherein said outer surface has a raised frame in which is formed said groove, said groove extending along the length of said frame.

6. The display panel of claim 1 further including an end plate which is removably attached to said display panel for removably securing said sign within said groove.

7. The display panel of claim 6 wherein said end plate has a pair of pins and said display panel has a pair of channels in which said pins are removably received.

8. In combination, a display panel; and a door handle, said door handle having an outer plate provided with a middle portion and a distal portion and being defined by oppositely facing inner and outer walls, the area of said inner wall which defines said distal portion being generally flat, said outer plate being adapted to be manually pushed or pulled in order to open and close a door, said display panel including inner and outer oppositely facing surfaces, said outer surface having means for removable attachment of a sign, said inner surface being flat throughout its extent save and except for one and only fastener which extends outwardly from said inner surface, said inner surface being otherwise free of any outward extensions therefrom, and opposing side walls extending between said inner and outer oppositely facing surfaces, said fastener being semi-circular and being composed of resiliently deformable material, said fastener comprising a wall having a free end defined by a terminal edge, and a fixed end, said wall commencing at said fixed end defined by the intersection of said inner surface and one of said side walls, continues from the intersection along a first curve extending from said intersection toward said opposing side wall over said inner surface to an apex and then continues from said apex along a second curve toward said inner surface and ends at said terminal edge, said terminal edge facing said inner surface and being the closest portion of said wall on said second curve to said inner surface, said terminal edge being spaced apart from said inner surface to form a slit between said terminal edge and said inner surface, said slit being free of an obstruction therein and receiving said outer plate of said door handle therein such that the area of the inner wall which defines said distal portion of said door handle lies flat on the area of the inner surface of the display panel beneath said fastener and such that said distal portion of the door handle is beneath said fastener while the middle portion of the door handle extends beyond said fastener, said terminal edge of said fastener being biased by said resiliently deformable material into contact with the outer wall of said outer plate with resulting resistance to removal of said plate from said slit, said terminal edge cooperating with the area of the inner surface of the display panel beneath said fastener to prevent the display panel from pivoting about said terminal edge when said display panel is pulled away from said outer plate such that said display panel is immobile relative to said handle when said display panel is pulled to open said door, and said terminal edge being flat and lying flat in contact with said door handle throughout its thickness such that said terminal edge prevents said distal portion of said door handle from pivoting about said terminal edge.

9. The display panel of claim 8 wherein said slit has terminal portions at either end and an intermediate portion between said terminal portions, the space between the edges which define said terminal portions being wider apart than the space between the edges which define said intermediate portion.

10. The display panel of claim 8 wherein said outer surface has a plurality of ribs which extend outwardly therefrom and against which said sign is adapted to abut.

11. The display panel of claim 8 wherein said means for removable attachment of a sign includes a groove which is formed in said outer surface and which is of a size suitable for accommodation of a margin of said sign such that said margin is removably secured therein.

12. The display panel of claim 11 wherein said outer surface has a raised frame in which is formed said groove, said groove extending along the length of said frame.

13. The display panel of claim 8 further including an end plate which is removably attached to said display panel for removably securing said sign within said groove.

14. The display panel of claim 13 wherein said end plate has a pair of pins and said display panel has a pair of channels in which said pins are removably received.

* * * * *